United States Patent [19]

Scherubel

[11] 4,237,975

[45] Dec. 9, 1980

[54] WELL STIMULATION METHOD USING FOAMED ACID

[75] Inventor: Gary A. Scherubel, Tulsa, Okla.

[73] Assignee: The Dow Chemical Company, Midland, Mich.

[21] Appl. No.: 895,333

[22] Filed: Apr. 11, 1978

[51] Int. Cl.$^3$ ............................................. E21B 33/13
[52] U.S. Cl. .............................. 166/281; 252/8.55 C; 166/307; 166/308
[58] Field of Search ...................... 252/8.55 C, 8.55 R, 252/316; 166/307, 308, 273-275, 282, 283, 259, 281

[56] References Cited

U.S. PATENT DOCUMENTS

| | | | |
|---|---|---|---|
| 3,974,077 | 8/1976 | Free | 252/316 |
| 4,113,631 | 9/1978 | Thompson | 252/8.55 C |

Primary Examiner—Benjamin R. Padgett
Assistant Examiner—J. L. Barr
Attorney, Agent, or Firm—L. W. White; G. H. Korfhage

[57] ABSTRACT

Improved fluid loss control is realized in an acidizing treatment of a subterranean formation of the type using foamed acid, particularly in a foamed fracture acidizing type treatment, by injecting a gelled, substantially unfoamed fluid as a pad ahead of the foamed acid.

16 Claims, No Drawings

WELL STIMULATION METHOD USING FOAMED ACIDI.

BACKGROUND OF THE INVENTION

A. Field of the Invention

The present invention relates to a method of stimulating a subterranean formation penetrated by a wellbore, particularly where a foamed acid is injected into the formation.

B. Description of the Prior Art

It is known to use foamed acid to treat subterranean formations penetrated by a wellbore. Representative of art teaching foamed acids for such use are Plummer et al., U.S. Pat. No. 3,100,528, which also teaches a cushion of inert gas may precede the foamed acid; Crawford et al., 15 *Journal Petroleum Technology* 237 (March, 1963), which teaches a foamed acid treatment using carbon dioxide; Neill et al., SPE Paper No. 738 (Oct. 6-9, 1963), which also teaches acidizing using carbon dioxide; Foshee et al., U.S. Pat. No. 3,323,593, which teaches compositions useful for fracturing and/or acidizing comprising foamed emulsions; Petty et al., U.S. Pat. No. 3,358,763, which teaches foamed acid treatments where nitrogen is added to the acid as a liquid, whereupon it vaporizes to form a foam; Jacobs et al., U.S. Pat. No. 3,330,346, which is specifically directed to foams using a particular class of foaming agents but which teaches such foams may be used in acidizing; Anderson et al., U.S. Pat. No. 3,612,179, which forms a foamed acid in situ by injecting in sequence, acid, an aqueous foaming agent, and a gas, and thereafter teaches to inject another slug of acid; Blauer et al., U.S. Pat. No. 3,937,283, which teaches optimum foam quality parameters; and Volz, U.S. Pat. No. 4,044,833, which teaches foamed acidizing wherein the foam contains a gelling agent.

Other possible pertinent art includes Plummer et al., U.S. Pat. No. 3,980,136, which is directed primarily to fracturing with foam including a partial bleedback step, but which suggests the fracturing foam may contain acid to stabilize clays; and Hutchinson et al., U.S. Pat. No. 3,463,231, and 3,572,440 which teach foamed acids, but apparently for use in cleaning the wellbore.

The teachings of all the foregoing art are expressly incorporated herein.

Notwithstanding the considerable body of art relating to foamed acid treatments, such treatments—particularly when carried out at rates and pressures sufficient to initiate or extend a fracture in the formation—have not proved as successful as might have been expected. Laboratory tests suggest that relatively high fluid loss may be the reason. Although the present invention is not to be limited as to any particular theory as to why fluid loss was relatively high in prior art foamed acid systems, it appears to be due to a combination of factors such as breaking of the foam upon reaction of the acid with the formation resulting in high calcium ion levels, loss of surfactant on the formation, loss of inert gas altering the foam quality to a point where the foam is no longer stable, and the like. Fluid loss of the foamed acid upon contact with the formation is significantly reduced according to the present invention.

II. SUMMARY OF THE INVENTION

The present invention is an improved method of treating a subterranean formation penetrated by a wellbore using a foamed acid in which at least a portion of the formation is soluble. The improvement is: prior to injecting the foamed acid, injecting a gelled, substantially unfoamed fluid as a pad fluid for said subsequent stage of foamed acid.

III. FURTHER DESCRIPTION OF THE INVENTION

The foamed acid stage of the present invention is well-known as illustrated by the art hereinabove discussed, and needs little further discussion. See particularly columns 3 and 4 of Volz, U.S. Pat. No. 4,044,833.

In the best mode presently contemplated for carrying out the present invention, from about 7.5 to about 28 weight percent most preferably about 15 weight percent, hydrochloric acid is preferred as the liquid portion of the foam. A suitable Mannich type inhibitor is also employed. Preferably, the foaming agent employed in the present invention is that disclosed in the commonly assigned application of James L. Thompson entitled "Foaming and Slit Suspending Agent," Serial No. 713,168 (now U.S. Pat. No. 4,113,631) filed Aug. 10, 1976. The foaming agent there described in a blend of (A) at least one alkyltrimethylammonium chloride, wherein the alkyl chain length is from 8 to 18 carbon atoms and the mode alkyl chain length is 12 or 14 carbon atoms, and (B) an amine oxide selected from the group consisting of bis(2-hydroxyethyl) cocoamine oxide, dimethylhexadecylamine oxide, and dimethyl-hydrogenated tallowamine oxide, wherein component (A) and (B) are in a weight ratio to one another (i) from about 45:55 to about 85:15 when Component (a) is cocotrimethyl ammonium chloride and Component (b) is bis(2-hydroxyethyl) cocoamine oxide, and (ii) from about 40:60 to about 95:5 when said Components (a) and (b) are selected so as to provide a combination other than cocotrimethyl ammonium chloride and bis(2-hydroxyethyl) cocoamine oxide.

Most prefereably the foaming agent employed is that described in a continuation-in-part application of said Ser. No. 713,168 namely, allowed Serial No. 791,628 (now U.S. Pat. No. 4,108,782), filed Apr. 27, 1977, which, in addition to Components (A) and (B), also includes (C) an adduct of tremethyl-1-heptanol plus seven moles of ethylene oxide; and (D) a perfluorinated surfactant of the formula

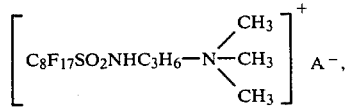

wherein $A^-$ is $Cl^-$, $F^-$, $I^-$, or $Br^-$.

Components (C) and (D) are in a weight ratio to one another of from about 1:1 to about 40:1. Based on the weight of the liquid phase of the foam, the foam most preferably contains Components (A) and (B) in a combined concentration of from about 0.035 to about 0.5 weight percent most preferably 0.13-0.4 weight percent, and Components (C) and (D) in a combined concentration of from about 0.03 to about 0.1 weight percent, most preferably 0.037-0.07 weight percent, provided as the 3:2 volume blend described in the text immediately preceding Table 17 in said Ser. No.

791,628. The teachings of each of said Ser. Nos. 713,168 and 791,628 are expressly incorporated herein.

Sufficient inert gas is provided in combination with the acid to form a suitable quality foam. Those skilled in the art will be able to prepare a foam of suitable quality based on the teachings of Blauer et al., U.S. Pat. No. 3,937,283. Preferably, the inert gas employed is carbon dioxide or nitrogen, and most preferably, a sufficient quantity is employed to give a Mitchell foam quality of from about 0.55 to about 0.85. Higher ratios of gas result in somewhat increased gas loss.

The gelled, substantially unfoamed fluid used as a pad may be gelled water, brine, or acid. Brine, preferably a sodium chloride saturated brine, is most preferred. By "substantially unfoamed" is meant containing insufficient gas to form a stable two phase comingled gas-liquid fluid mixture under the formation conditions. Ideally, the pad is unfoamed, but as pointed out in Henry, U.S. Pat. No. 3,245,470 at column 3, lines 16-22, it is mechanically expedient to keep at least a small amount of gas flowing into the treatment line once the treatment has begun, and injection of a gel which is temporarily foamed at the earth's surface but which would not be predicted to remain foamed by the time it reaches the formation is considered within the scope of the present invention.

The thickening agents employable in the present invention include the natural, modified, and synthetic gums which are water soluble or dispersible and which do not precipitate in the presence of acid. Galactomannan gums and modified galactomannan gums are particularly useful as thickening agents in the present invention. A more detailed discussion of galactomannan gums suitable for use herein are described in Free, U.S. Pat. No. 3,974,077, at column 2, lines 18-49, the teachings of which are expressly incorporated herein. Also ideally suited for use herein are the various water soluble or dispersible cellulose derivatives which are considered modified gums, such as alkylecelluloses, carboxyalkylcelluloses, hydroxyalkylcelluloses, and alkylhydroxyalkylcelluloses. Specific examples include carboxymethyl-, methyl-, hydroxypropyl-, hydroxypropylmethyl-, hydroxyethyl-, ethylhydroxyethylcellulose, and the like. Synthetic water soluble or dispersible gums such as certain vinyl polymers (i.e. those which do not precipitate in acid) and ethylene oxide polymers may also be employed as the thickening agent.

If desired, the gel may be a crosslinked system such as that taught by Chrisp, U.S. Pat. No. 3,301,723; Kern, U.S. Pat. No. 3,058,909; Free, U.S. Pat. No. 3,974,077; Holymyer et al., U.S. Pat. No. 4,021,355; Tiner et al., U.S. Pat. No. 3,888,312; or the like. However, uncrosslinked gels have generally proved satisfactory for purposes of the present invention. Also, in employing a crosslinked gel, care should be taken to select combinations of gelling agents and crosslinkers which do not form insoluble precipitates in the presence of acid.

When employing an uncrosslinked gel, the amount of thickening agent employed in the aqueous solution depends on the desired working viscosity of the solution. Aqueous solutions having viscosities ranging from about 20 to 100 centipoise (cps) are desirable as measured with the Fann model 35 viscometer at 100 rpm at the temperature to which the fluid will be exposed. The exact amount of thickening agent to be employed in any particular aqueous solution will depend on the particular thickening agent employed and its viscosity building characteristics, the temperature of the fluid, the formation permeability, the amount of time it is desired to have a maximum viscosity of the working temperature in the fluid and the like. Generally from about 20 to about 100 pounds of the thickening agent per 1000 gallons of aqueous solution is employed (about 2.4 to about 12 kg/m$^3$). These parameters can be easily ascertained for any particular system by performing simple laboratory experiments.

If desired, conventional breakers—e.g., enzymes, persulfates, enediol compounds such as ascorbic acid as disclosed in the commonly assigned copending application of Clark et al., Ser. No. 801,667 filed May 31, 1977—may also be employed in the pad fluid.

Preferably, the gelled pad fluid also contains a foaming agent. The foaming agents hereinabove described for the foamed acid may also be employed in the pad in generally the same proportions (calculated as a percent of the aqueous portion of the gel) as used in the foamed acid. The most preferred range for the total concentration of Components (A) and (B), however, is about 0.045-0.18 weight percent.

In carrying out the method of the present invention, the gelled pad and the foamed acid are injected into the formation in sequence. Both fluids may be injected at a matrix rate if desired. However, the advantages of the present invention are most apparent when the invention is practiced in the context of a fracture acidizing treatment, i.e., where at least one of, and usually both, the gelled pad and the foamed acid are injected at a rate sufficient to initiate or extend a fracture in the formation. In a fracture acidizing treatment, one or both of the fluids may contain a propping agent. Preferably, in either fracture acidizing or matrix acidizing treatments according to the present invention, the cycle of gelled pad fluid followed by foamed acid is repeated at least once and preferably a plurality of times.

If desired, the first stage of gelled pad fluid may be preceded by conventional acid, e.g., a substantially foam-free and gelling agent-free 15 percent inhibited HCl, to initiate formation breakdown. A gelled pad preferably containing said most preferred surfactant blend of Ser. No. 791,628 may then be injected at a rate sufficient to initiate a fracture. Foamed acid and then alternating stages of gel and foamed acid may be injected to further propagate the fracture, and finally, the treatment may be concluded by displacing the final foamed acid stage with a suitable displacement fluid such as foamed brine.

IV. EXAMPLES

The following examples and comparison runs further illustrate the practice of the present invention and its advantages over the prior art.

The following tests were carried out on 6-inch long limestone cores having a diameter of 1 inch. The cores were mounted in vertically in a Hassler sleeve apparatus, and treatment fluids were injected upward through the core at a back pressure of 1000 psi. Unless otherwise noted, the foamed acid contained by volume of liquid, about 0.4 percent a Mannich-type corrosion inhibitor and 1.0 percent of the preferred surfactant blend of said Ser. No. 713,168, namely a 75:25 volume blend of Arquad C-50 cocotrimethylammonium chloride solution and Aromox C/12 bis (2-hydroxyethyl) cocoamine oxide solution. Nitrogen was used as the inert gas for the foam.

Comparison Run 1

A core having a permeability to API brine of 4.4 millidarcies (md) was purged with nitrogen. The core was then treated with foamed 28 percent hydrochloric acid having a Mitchell quality of 0.55. After 30 minutes, nitrogen fluid loss, measured at 76° F. and 1000 psi, was 51.6 ml.

Comparison Runs 2-4

Substantially identical tests were run using 0.65, 0.75, and 0.85 quality foam. Nitrogen loss test results were 38.1 ml, 44.5 ml (at 70° F.), and 62.1 ml (at 70° F.) respectively.

Comparison Run 5

In the same manner, on another core having a permeability to nitrogen of 4.4 md, the core was saturated with foamed brine prior to injection of the foamed acid. The acid concentration used was 15% HCl which was injected as a 0.75 quality foam. After 30 minutes, fluid loss was 12.6 ml nitrogen at 1000 psi and 64° F. This comparison run demonstrates that a foamed brine pad provides somewhat improved fluid loss control over that realized on a dry core.

EXAMPLE 1-4

In the same manner as in Comparison Runs 1-4, 28% foamed HCl was injected a 0.55, 0.65, 0.75, and 0.85 foam into cores having a permeability to API brine of about 4.5. For each of these tests, however, the core was first saturated with tap water gelled with hydroxypropyl guar at a concentration of 40 lbs/1000 gallons of water (4.8 kg/m³). Nitrogen fluid loss after 36 minutes for each test was 1.2 ml (74° F.), 0.9 ml (66° F.), 2.4 ml (64° F.), and 1.0 ml (72° F.), demonstrating significant improvement over Comparison Runs 1-5. Moreover, the low fluid loss was realized over a relatively large range of foam quality, making precise control of foam quality less critical.

EXAMPLES 5-8

Forty pound per thousand gallon gels of different gelling agents were evaluated on cores having an API brine permeability in the range of 4-6 md according to the procedure of Example 1, i.e. using 0.55 quality foamed 28% HCl. After 36 minutes, nitrogen fluid loss results were as follows:

Hydroxypropyl guar: 1.2 ml
Guar Gum: 0.5 ml
Hydroxyethyl cellulose: 2.1 ml
Carboxymethylhydroxyethyl cellulose: 1.1 m.

the foregoing results demonstrate that the aqueous gelling agent employed is not critical. Gelled kerosene, however, was not effective; the kerosene apparently causes the foam to break. Nitrogen fluid loss using such a gelled kerosene pad was 49.6 m. after 36 minutes.

EXAMPLES 9-10

The following series of tests carried out at ambient temperature using a hydroxypropylguar pad and a 0.55 quality foamed 28% HCl, compares the effect of permeability and gelling agent concentration on fluid loss. In these tests, the pads were injected into the cores for 30 minutes at an average flow rate of 5.17 ml/min at 1000 psi. Results were as follows:

| Gelling agent concentration lb/1000 gal. | Core Permeability, md | ml N$_2$ 36 min. |
| --- | --- | --- |
| 20 | 0.5 | 1.7 |
| 40 | 0.5 | 3.7 |
| 20 | 4.6 | 8.9 |
| 40 | 4.6 | 1.5 |
| 60 | about 100 | 28.4 | for a 100 md core, the 28.4 ml of nitrogen loss is particularly remarkable.

What is claimed is:

1. In a method of treating a subterranean formation penetrated by a wellbore, wherein a foamed acid in which at least a portion of the formation is soluble is injected into the formation so that at least a portion of the formation is dissolved, the improvement which comprises: prior to injecting said foamed acid, injecting a gelled, substantially unfoamed fluid as a pad fluid for said subsequent stage of foamed acid.

2. The method of claim 1 wherein at least the foamed acid stage is injected at a rate and pressure sufficient to initiate or extend a fracture in said formation.

3. The method of claim 2 wherein the injection sequence of gelled pad fluid followed by foamed acid is repeated at least once.

4. The method of claim 3 wherein the gelling agent for the pad fluid is selected from the group consisting of guar gum and hydroxypropyl guar.

5. The method of claim 2 wherein at least one of the gelled pad fluid or the foamed acid contains a propping agent, said proppant containing stage being injected at a sufficient rate and pressure to initiate or extend a fracture in the formation.

6. The method of claim 1 or 2 wherein the gelling agent for the pad fluid is guar gum or hydroxypropyl guar gum.

7. The method of claim 1, 2, or 4 wherein each of the pad fluid and the foamed acid contains a foaming agent.

8. The method of claim 7 wherein the foaming agent in each of the pad fluid and the foamed acid comprises a blend of
   (A) at least one alkyltrimethylammonium chloride, wherein the alkyl chain length is from 8 to 18 carbon atoms and the mode alkyl chain length is 12 or 14 carbon atoms, and
   (B) an amine oxide selected from the group consisting of bis (2-hydroxyethyl) cocoamine oxide, dimethylhexadecylamine oxide, and dimethyl-hydrogenated tallowamine oxide, wherein Component (A) and Component (B) are in weight ratio to one another of
      (i) from about 45:55 to about 85:15 when Component (A) is cocotrimethyl ammonium chloride and Component (B) is bis (2-hydroxyethyl) cocoamine oxide, and
      (ii) from about 40:60 to about 95:5 when said Components (A) and (B) are selected so as to provide a combination other than cocotrimethyl ammonium chloride and bis (2-hydroxyethyl) cocoamine oxide.

9. The method of claim 8 wherein said foaming agent additionally includes:
   (C) an adduct of trimethyl-1-heptanol plus seven moles of ethylene oxide; and
   (D) a perfluorinated surfactant of the formula

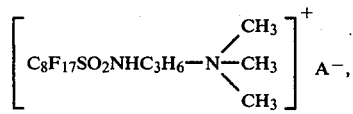

wherein A⁻ is Cl⁻, F⁻, I⁻, or Br⁻,
wherein
Components (C) and (D) are in a weight ratio to one another of from about 1:1 to about 40:1, and wherein each of the pad fluid and the foam (by weight of liquid phase) contains Components (A) and (B) in a combined concentration of from about 0.035 to about 0.5 weight percent and Components (C) and (D) in a combined concentration of from about 0.03 to about 0.1 weight percent.

10. The method of claim 9 wherein at least one of the pad fluid or the foam contains a propping agent, said proppant containing stage being injected at a sufficient rate and pressure to initiate or extend a fracture in the formation.

11. The method of claim 9 comprising as an initial step, injecting an aqueous, substantially foam-free and gelling agent-free acid into the formation; injecting said gelled pad fluid containing said foaming agent at a rate and pressure sufficient to initiate said fracture; injecting said foamed acid at a rate and pressure sufficient to extend said fracture; and injecting at least one additional cycle of said gelled pad fluid followed by foamed acid at a rate and pressure sufficient to further extend said fracture.

12. The method of claim 11 wherein the final stage of foamed acid is displaced with foamed brine.

13. The method of claim 1 wherein said pad fluid is a gelled brine.

14. The method of claim 13 wherein said pad fluid is a sodium chloride saturated gelled brine.

15. The method of claim 11 wherein said pad fluid is a gelled brine.

16. The method of claim 15 wherein said pad fluid is a sodium chloride saturated gelled brine.

* * * * *